Figure 1:
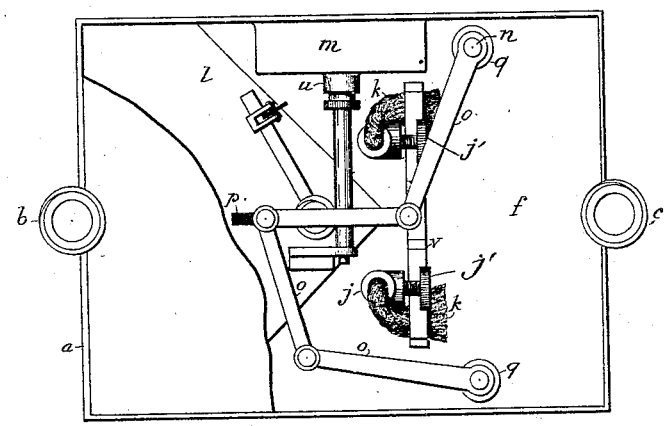

J. R. DALY.
AUTOMATIC OILING DEVICE FOR GAS METER DIAPHRAGMS.
APPLICATION FILED AUG. 17, 1908.

939,675.

Patented Nov. 9, 1909.
2 SHEETS—SHEET 1.

Witnesses:
Geo. Lebuern
E. M. Wilson

Inventor
James R. Daly

J. R. DALY.
AUTOMATIC OILING DEVICE FOR GAS METER DIAPHRAGMS.
APPLICATION FILED AUG. 17, 1908.

939,675.

Patented Nov. 9, 1909.

2 SHEETS—SHEET 2.

Witnesses:
Geo. Le Guerr
L. M. Wilson

Inventor
James R. Daly

UNITED STATES PATENT OFFICE.

JAMES REGEAN DALY, OF NEW ORLEANS, LOUISIANA, ASSIGNOR TO JOHN EMORY CROSS, OF BALTIMORE, MARYLAND.

AUTOMATIC OILING DEVICE FOR GAS-METER DIAPHRAGMS.

939,675.  Specification of Letters Patent.  Patented Nov. 9, 1909.

Application filed August 17, 1908. Serial No. 448,972.

*To all whom it may concern:*

Be it known that I, JAMES REGEAN DALY, a citizen of the United States of America, residing at New Orleans, in the parish of Orleans and State of Louisiana, have invented certain new and useful Improvements in Automatic Oiling Devices for Gas-Meter Diaphragms, of which the following is a specification, reference being had therein to the accompanying drawing.

This invention relates to dry meters for measuring the flow of illuminating gas or the like, and the particular type of dry meter to which the invention is applied is that which has a measuring chamber to which the gas is admitted at intervals and from which it is released at corresponding intervals. This chamber is divided by means of a loose flexible member which will be hereinafter termed a diaphragm, into two contracting and expanding chambers for the gas. The pulsations of the diaphragm as the gas is admitted to and released from the expanding chambers alternately are communicated to suitable registering means. In this way, the volume of the gas going through the meter is measured. The operation of such meters is so well known that it need not be described in further detail. The diaphragms have been made of various materials but the one now most generally used is leather. To secure accurate measurement, it is necessary that the diaphragm be not only impervious to the gas to be measured, but that its flexibility be constant.

It is an essential condition to the use of gas meters that they are in operation for long periods without attention. The diaphragms are inside the measuring chambers and inaccessible. The nature of the gas used is such that it has a strong affinity for oil and in a short time it extracts the oil from the leather forming the diaphragm. The latter becomes hard, dry and porous and cracks develop. This condition of the diaphragm offers serious obstacles to the operation of the meter. The gas which passes through the pores and cracks in the leather is not measured and when the diaphragm becomes stiff and crisp it not only offers increased resistance to the passage of the gas, but does not inflate in the same form as when soft and errors of measurement occur on this account.

The object of the present invention is to provide a lubricating device by means of which the diaphragm may be kept soft and pliable for a long period, during which the meter receives no attention. In this way, the pliability of the diaphragm is rendered constant, its pores are filled, cracking is prevented and the greatest accuracy of measurement is secured; also, the resistance to the passage of gas is maintained at the minimum.

In the embodiment of my invention to be described herein, the meter is provided with a receptacle for lubricant of a size to hold sufficient oil for several months or even a year, and suitable means, shown in this instance in the form of a wick, is provided to conduct the oil from the reservoir to the diaphragm. The size of the wick may be determined by the rate at which the oil is extracted or dried or otherwise rendered unavailable for the purposes of lubrication for the passage of oil may be regulated and the escape of gas prevented by compressing the wick a predetermined amount by means of a device hereinafter described.

The accompanying drawings illustrate an embodiment of my invention.

Figure 2:
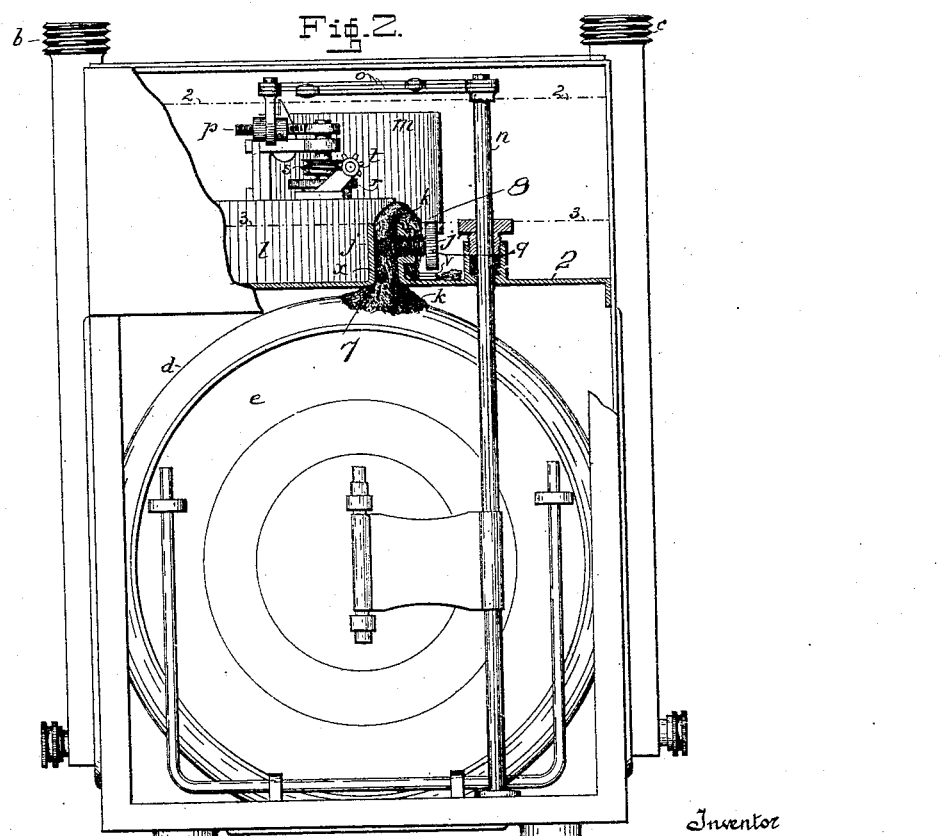
Figure 3:
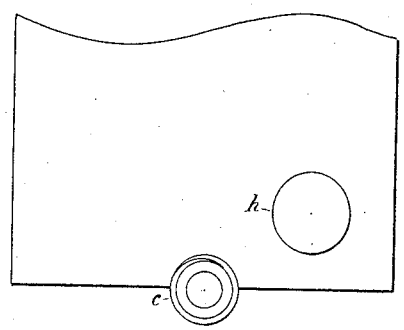
Figure 4:
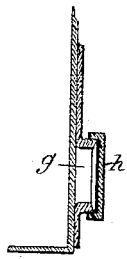
Figure 5:
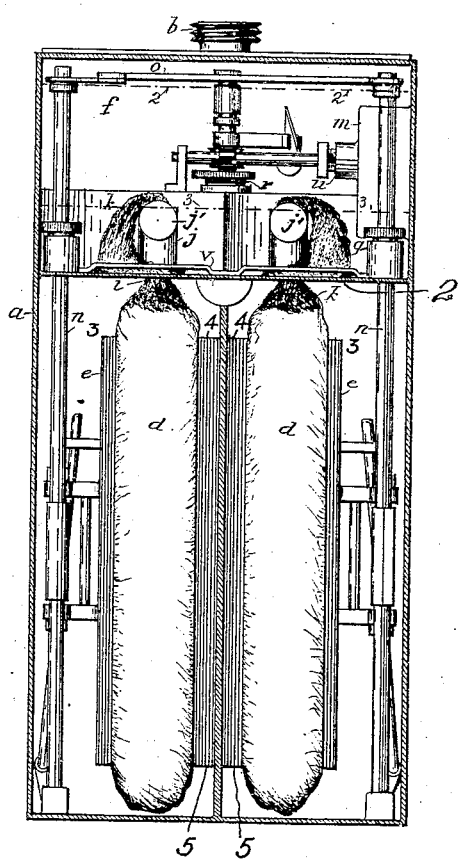

Figure 1 is a top view of a meter to which my invention has been applied. In this view, the casing is broken away to show the oiling device in plan view. Fig. 2 is a sectional elevation of the meter. Fig. 3 is a fragmentary top plan showing the position of the oil supply opening. Fig. 4 is a section through the oil supply opening and valve. Fig. 5 is a vertical section taken at right angles to the section of Fig. 2.

The meter consists of a box or casing, $a$, having an inlet, $b$, for gas and an outlet $c$ for the same. The upper portion, $f$, of the casing, $a$, constitutes the index chamber and is divided from the measuring chamber 3 of the meter by means of a horizontal partition 2. The measuring chambers 3 of the meter contain the expanding chambers 4 the walls of which in this instance consist each of a stationary disk 5 and a moving disk $e$, which are connected by means of a loose, flexible, circular diaphragm $d$. Each measuring chamber is thus divided into two contracting and expanding chambers for the gas. These chambers contract and expand alternately as the gas is admitted to and released from each such expanding and contracting chamber in turn. The entrance and exit of the gas to the chambers 3 and 4 is controlled by suitable valves not shown. These valves are housed in the valve box $l$ and are actuated by the moving disks, the motion of which is communicated to the valves through suitable mechanism $n$, $o$, $p$, etc. The diaphragms are also connected by means of worm $s$, worm wheel $t$ and shaft $u$ to a suitable dial not shown which is housed in the dial box $m$. The horizontal partition 2 is apertured over the diaphragms at 7 and a short section of vertical pipe or tube $j$ is secured to the horizontal partition 2, registering with each aperture 7 and extending upward therefrom. The upright tube or pipe $j$ serves as a holder for a wick $k$ which is passed through the pipe and is brought in contact with the diaphragm below the partition 2. The opposite end of the wick which projects from the upper extremity of the holder $j$ is turned over, brought down to the upper side of the partition 2 where it is passed through a fastener $v$ in the form of a strap which is secured to the partition at its extremities and at its middle point and between these points, spaced from the partition by a slight interval. The strap thus applied forms a fastener for the two wicks, one for each diaphragm. The tube or pipe $j$ is provided intermediate its length with a boss 8 which is bored and tapped to receive a thumb screw 9 placed at right angles to the aperture of the tube $j$. By tightening the screw 9, the wick can be compressed at the will of the operator for a purpose to be hereinafter set forth.

Though the above description of the method of conducting oil from the reservoir to the diaphragm relates to the preferred form of my invention, the details described are not considered essential to my invention.

In the operation of the device, a wick is passed through each holder with its lower extremity spread out in the form of a brush, in contact with the corresponding diaphragm $d$. The other end of the wick is flattened and passed through the fastener $v$ at the bottom of the chamber. Lubricating oil sufficient for a long period, as several months is placed in the index chamber $f$, covering the bottom of the chamber and the flattened extremity of the wick. It is apparent that the oil will be taken up by the wick by capillary attraction and carried to the top of the tube $j$. From this point the oil will descend by capillarity and gravity to the diaphragm $d$. The pressure of the gas is normally greater than the pressure of the outside air and the flow of the oil by capillarity and gravity takes place against this pressure. The leather will take up the lubricating oil which will be distributed over the diaphragm, due to capillary action or absorption of the flexible material of which the diaphragm is composed. The amount of oil to be supplied is preferably equal to the amount taken from the diaphragm by the gas passing through the meter. This feed is regulated by turning the screw 9 to put the necessary amount of pressure on the wick.

Having thus described my invention, what I claim and desire to secure by Letters Patent is:

1. In a gas meter, a measuring chamber, a flexible diaphragm dividing the measuring chamber into two chambers for the gas so that both sides of the diaphragm are exposed to the gas, a container for oil accessible from without to receive oil without opening the measuring chamber, the measuring chamber and the oil container being connected by a passage, and a wick leading from the container through the passage to the diaphragm, the whole being so constructed that access of the gas to the oil in the container is prevented.

2. In a gas meter, a measuring chamber, a flexible diaphragm dividing the measuring chamber into two chambers for the gas so that both sides of the diaphragm are exposed to the gas, a container for oil accessible from without to receive oil without opening the measuring chamber, the measuring chamber and the oil container being connected by a passage, and a wick leading from the container through the passage to the diaphragm, the whole being so constructed that access of the gas to the oil in the container is prevented, and means for compressing the wick a predetermined amount to regulate the supply of oil.

3. In a gas meter, a measuring chamber, a flexible diaphragm dividing the measuring chamber into two chambers for the gas so that both sides of the diaphragm are exposed to the gas, a container for oil accessible from without to receive oil without opening the measuring chamber, and means whereby oil is conducted from the container to the diaphragm, the whole being so constructed that access of the gas to the oil in the container is prevented.

In testimony whereof I affix my signature in presence of two witnesses.

JAMES REGEAN DALY.

Witnesses:
J. P. BEANER,
W. C. WILSON.